(12) United States Patent
Bainville et al.

(10) Patent No.: US 7,849,693 B2
(45) Date of Patent: Dec. 14, 2010

(54) FUEL INJECTOR FOR A GAS TURBINE ENGINE COMBUSTION CHAMBER

(75) Inventors: Francois Rene Daniel Bainville, Saint Pierre les Nemours (FR); Denis Jean Maurice Sandelis, Nangis (FR); Stephane Henri Guy Touchaud, Vincennes (FR)

(73) Assignee: SNECMA, Paris (FR)

( * ) Notice: Subject to any disclaimer, the term of this patent is extended or adjusted under 35 U.S.C. 154(b) by 436 days.

(21) Appl. No.: 11/868,176

(22) Filed: Oct. 5, 2007

(65) Prior Publication Data

US 2008/0083841 A1 Apr. 10, 2008

(30) Foreign Application Priority Data

Oct. 6, 2006 (FR) .................................. 06 54137

(51) Int. Cl.
*F02C 1/00* (2006.01)
(52) U.S. Cl. .......................................... 60/737; 60/742
(58) Field of Classification Search .................. 60/737, 60/742, 746–748, 39.11
See application file for complete search history.

(56) References Cited

U.S. PATENT DOCUMENTS

| 3,763,650 A | * | 10/1973 | Hussey et al. ............ 60/39.463 |
| 4,720,970 A | | 1/1988 | Hudson et al. |
| 2003/0106321 A1 | | 6/2003 | Von Der Bank |
| 2006/0101814 A1 | | 5/2006 | Saitoh et al. |

FOREIGN PATENT DOCUMENTS

| EP | 1 199 523 A1 | 4/2002 |
| EP | 1 278 014 A2 | 1/2003 |
| FR | 2 695 713 | 3/1994 |
| GB | 774704 | 5/1957 |
| GB | 824306 | 11/1959 |
| JP | 64-33421 | 2/1989 |

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A fuel injector for a gas turbine engine combustion chamber is disclosed. The fuel injector includes a first fuel supply line for running at idle speed, a second, main, fuel supply line for running at speeds up to full throttle, and first and second injection orifices with which the two fuel supply lines respectively communicate. The injection orifices are arranged in a ring and the first orifices occupy a sector of the ring.

10 Claims, 2 Drawing Sheets

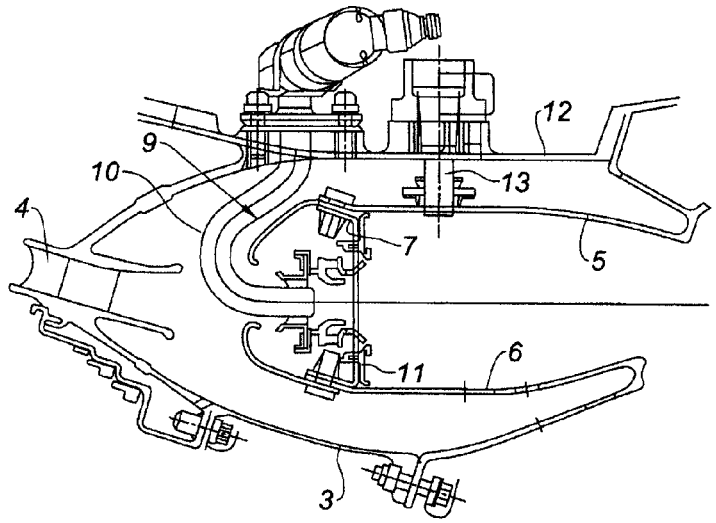
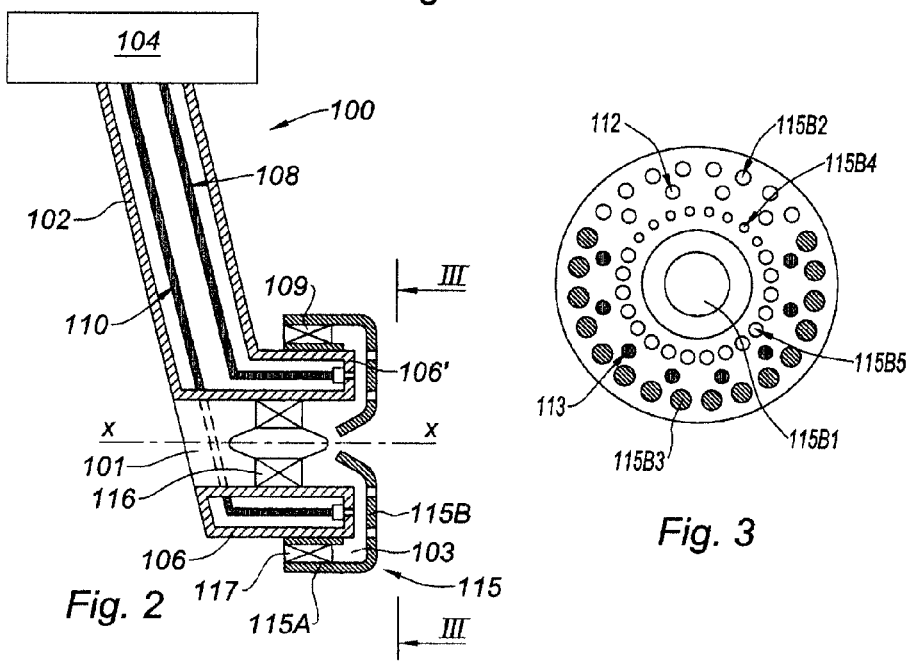
Fig. 1
Fig. 2
Fig. 3

FUEL INJECTOR FOR A GAS TURBINE ENGINE COMBUSTION CHAMBER

BACKGROUND OF THE INVENTION AND DESCRIPTION OF THE PRIOR ART

The present invention relates to the field of gas turbine engines and is aimed in particular at means for injecting fuel into the combustion chambers of such engines.

The combustion chamber of a gas turbine engine is functionally positioned between the compression section from which it receives the air after it has been compressed, and the turbine section that it supplies with hot gases. It is generally contained inside an annular enclosure delimited by a radially outer casing and a radially inner wall protecting the drive shafts. According to one embodiment of the prior art, the chamber in which combustion takes place is itself defined between two coaxial shell rings, one of them an inner shell ring and the other an outer shell ring, spaced apart from the abovementioned two walls by appropriate flanges or supports. The upstream chamber end, at the compressor end, is provided with an upstream cowling by means of which the incident air flow leaving the diffuser is partially distributed towards the inside of the chamber where primary combustion takes place and partly downstream of the latter, by passing it. Fuel injection means associated with air guiding deflectors form a turbulent carburetted air mixture which enters the chamber through openings formed in the end of the chamber which also comprises deflectors that control the circulation of the carburetted air.

This system does not allow for optimum combustion at all running speeds, because the conditions vary between engine idling speed and full throttle. In order to improve the operation of the combustion chamber at these various speeds and to meet requirements aimed at reducing pollution, attempts are being made at limiting, on the one hand, the formation of unburned combustion residue resulting from excessively fuel-rich mixtures and, on the other hand, the formation of oxides of nitrogen which are associated with the flame temperature.

Combustion chamber designs have been proposed that have mixers suited to idling running conditions and to full throttle running conditions respectively. For example, a dual annular combustion chamber is known, which has a radial staging of the mixers so as to form distinct combustion zones which are supplied appropriately according to the engine speed. At idle speed, only the radially outer mixers are supplied with fuel, defining primary idling combustion zones. At full throttle, the radially inner mixers are in turn supplied for optimum combustion.

Combustion chambers have also been developed which have dual annular turbulent gas flow mixers. In a mixer such as this, the fuel supplied by a central pilot injector is mixed with a first turbulent annular air flow to supply a low idle first combustion zone. The mixer comprises an additional injection device, of annular shape and coaxial with the first, delivering fuel radially onto a second turbulent air flow coaxial with the first. This second injector is supplied according to the engine demand for power. An example of this device is described in patent U.S. Pat. No. 6,484,489.

Document EP 1 531 305 describes a multipoint fuel injection device for the combustion chamber of a gas turbine engine comprising a plurality of fuel injection nozzles arranged in at least two rows, for example concentric ones, with means controlling the fuel supply separately in each of the rows. The nozzles each comprise a duct with means such as swirl inducers to create a turbulent flow therein. This device makes it possible to keep a flame, in each row of nozzles, at a temperature high enough to reduce the emissions of polluting gases.

SUMMARY OF THE INVENTION

It is an object of the present invention to produce a fuel injector that allows staged combustion, that is to say that makes it possible to create one combustion zone in the idling phase and a main combustion zone, that meets the ever tightening standards concerning the emission of pollutants.

This object is achieved using a fuel injector for a gas turbine engine combustion chamber, comprising a first fuel supply line for running at idle speed, and a second, main, fuel supply line for running at speeds up to full throttle, first orifices for idle and second, main, injection orifices with which the two supply lines respectively communicate, and through which the fuel is injected. This fuel injector is one wherein the injection orifices are arranged in a ring, the first orifices occupying a sector of said ring. The injector comprises a plurality, $n1>2$, of idling injection orifices and a plurality $n2>2$ of main injection orifices, in a ratio such that $n1/n2<1$.

Whereas in the prior art the main air flow surrounds the combustion zone for running at idle speed and to a certain extent masks it, the solution of the invention makes it possible to create a combustion zone for running at idle speed which is not masked by the main air flow, the lateral flame propagation thereby being improved.

As a preference, because of the respective flow rates of low idle speed and speeds up to full throttle, the ratio is $n1/n2 \leq \frac{1}{2}$ and more particularly $n1/n2 \leq \frac{1}{3}$. For example, for idling orifices of a diameter $\phi1$ in millimeters, such that $0.5<\phi1<0.8$ and main injection orifices of a diameter $\phi2$, such that $0.8<\phi2<1.2$, the values may be $n1=4$ and $n2=8$.

According to another feature, the injector comprises a central primary-air supply duct, the injection orifices being distributed about said duct that forms a primary-air duct. Advantageously, the injector comprises an annular distributor-forming portion in which at least some of the fuel injection orifices are formed on a transverse plate. A screen-forming plate pierced with premixing orifices is positioned across at least some of the fuel injection orifices. More specifically, said premixing orifices are positioned in such a way as to be swept by the air of the primary flow so as to premix primary air with fuel from the first injection orifices. With this solution, fuel and air is premixed as soon as it leaves the injector.

In order to ensure effective premixing, the central duct has a swirl inducer by means of which the air entering the duct is set in axial rotation.

According to another feature, the injector comprises an annular secondary-air supply duct coaxial with the ring formed by the fuel injection orifices. More specifically, the screen-forming plate is pierced with orifices for premixing secondary air with fuel from the second injection orifices.

Advantageously, the annular secondary-air duct has a swirl inducer.

The present invention also relates to a gas turbine engine comprising an annular combustion chamber with injectors according to the invention distributed about the axis of the chamber, in which the idling fuel injection sectors are positioned radially towards the outside with respect to the axis of the combustion chamber.

The method of running the engine consists, at idle, in supplying only the idle supply circuit so as to form a radially outer annular combustion zone consisting of combustion zones relating to each of the injectors. Because of their layout, these zones are in close proximity to the spark plugs which ensure effective ignition.

BRIEF DESCRIPTION OF THE DRAWINGS

Other features and advantages will become apparent from reading the description of one nonlimiting embodiment of the invention with reference to the attached drawings in which:

FIG. 1 depicts, in axial section, one example of a combustion chamber installed on gas turbine engines currently in use;

FIG. 2 schematically depicts an injector of the injection, in axial section, viewed from the side;

FIG. 3 shows the injector head-on in the direction III-III; and

DESCRIPTION OF THE PREFERRED EMBODIMENT

Figure 4:
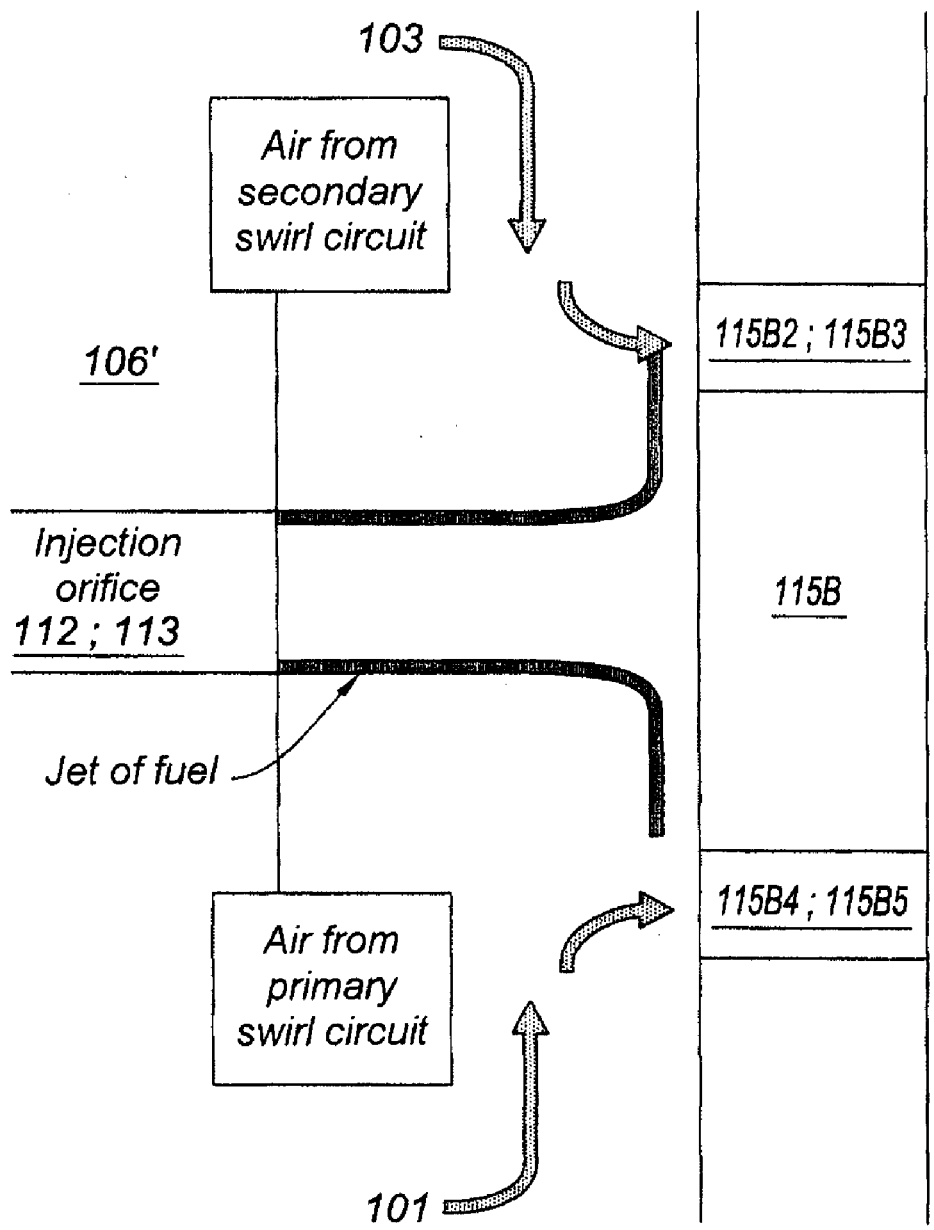
FIG. 4 shows the operating diagram for premixing the fuel with the incoming air.

The gas turbine engine combustion chamber 1 to which the injector of the invention may be applied is annular and mounted, as is known, between an outer case 2 and an inner case 3, which is cylindrical, along the engine axis. The cases 2 and 3 thus form an annular space that is open upstream, with respect to the gas flow, onto a diffuser 4 communicating with the final stage of the compressor, not depicted. The chamber is open downstream onto the first turbine stage, not depicted, that receives the gases heated in the chamber. The chamber is made up of an outer wall 5 and of an inner wall 6 in the form of shell rings formed together and supported by appropriate flanges on the elements of the case. Upstream, the chamber is delimited by a chamber end wall 7 which is transverse with respect to the gas flow in the chamber. This wall 7 is provided with circular axial openings into which the fuel and the primary combustion air emerge. Some of this air and the fuel are mixed in mixers 8, each open onto one of the circular openings. These mixers are housed in cowlings 9 which guide the air flow from the diffuser 4. They generally comprise axial or radial swirl inducers via which the air is introduced, set in rotation, and becomes turbulent. The fuel is injected at this point into the turbulent flow in each mixer by a fuel injector 10 which atomizes it into fine droplets. These droplets are mixed and vaporized by the air delivered through the swirl inducers and the mixture produced is introduced into the chamber. In the example depicted, the end of the chamber comprises additional orifices with deflectors 11. It can be seen that there is a radial spark plug 13 fixed to the case 2, its end lying flush with the outer wall 5 of the combustion chamber, through an opening. The spark plug is at a determined axial distance from the end of the chamber so as to ignite the air/fuel mixture, the boundaries of which are depicted by a fuel ejection cone.

The invention aims to reduce the pollutant emissions at idling speeds by creating an idling combustion zone and by creating the conditions of the ignition.

FIG. 2 shows an example of an injector according to the invention.

The injector 100 comprises a tubular portion 102 mounted on a mounting plate 104 via which it is fixed to an appropriate support on the combustion chamber. The tubular portion is extended by a fuel distributor-forming portion 106 of annular shape, closed by a transverse wall 106'. The axis XX of this distributor 106 corresponds to the line along which fuel is injected into the combustion chamber. First and second fuel supply lines 108 and 110 respectively are housed in the injector and are in communication with appropriate supply circuits through the mounting plate 104. The lines 108 and 110 pass through the distributor 106. The lines each supply a respective manifold 109 and 110. The manifolds are open in the downstream direction with orifices 112 and 113 formed respectively in the transverse wall 106' of the distributor 106. The orifices are sized according to the respective flow rate of each of the lines.

The annular distributor forms a cylindrical central duct 101 of axis XX, open upstream and downstream. This primary-air duct 101 comprises an axial flow swirl inducer 116, consisting of a radial fin, causing the primary air that has entered this duct via the upstream opening to be set in rotation about the axis.

A premixing component 115 is mounted on the distributor 106. This component 115 comprises a sleeve-shaped part 115A delimiting an annular secondary-air duct 103 with the cylindrical part of the distributor 106 of axis XX. The duct is open upstream and comprises a swirl inducer 117, consisting of radial fins. The purpose of the swirl inducer is to force the air flow passing through it to adopt a rotational movement about the axis XX. The sleeve 115A is closed at the downstream end by a plate 115B perpendicular to the axis XX. The plate is distant from the transverse wall 106' of the distributor. This plate comprises a central opening 115B1 with a rim forming a guide surface of frustoconical shape 115C, the axis of which is XX. The plate 115B is a determined distance away from the wall 106' and comprises premixing orifices 115B2, 115B3, 115B4 and 115B5.

The premixing orifices are arranged in relation with the injection orifices 112 and 113.

In the example that corresponds to the depiction of FIG. 3, the injector comprises n1=4 idle fuel injection orifices 112 and n2=8 main fuel injection orifices 113. The orifices are sized according to the required flow rates. The number of them is chosen also according to the diameter D of the injector. The total number may be as high as 18 without presenting any mechanical integrity problems.

For example, the idling orifices 112 have a diameter $\phi_{i1}$ ranging between 0.5 and 0.8 mm and the main fuel injection orifices 113 have a diameter $\phi_{i2}$ ranging between 0.8 and 1.3 mm. The diameter D of the injector is chosen to allow a satisfactory annular distribution of these orifices. For example, D is of the order of 50 to 70 mm.

The premixing orifices 115B2, 115B3, 115B4 and 115B5 in the plate 115B form two rings situated radially on each side of the ring formed by the orifices 112 and 113. The diameters $\phi_p$ of these premixing orifices 115B2, 115B3, 115B4 and 115B5 are determined according to the diameters of the orifices 112 and 113.

In the example considered, the diameter of the idling premixing orifices $\phi_{p1}$ ranges between 1 and 1.5 mm whereas the diameter $\phi_{p2}$ of the main fuel premixing orifices ranges between 2 and 3 mm.

The operating principle of this multipoint premixing injector is described hereinafter with reference to FIG. 4.

The fuel injected through the orifices 112 or 113 strikes the plate 115B between two premixing orifices (115B2 and 115B4) or (115B3 and 115B5). The space between the wall 106' and the plate 115B, of the order of 2 to 4 mm in the example, is swept on one side by the primary air from the duct 101 and on the other side by the secondary air from the duct 103. The fuel which spreads out radially in the form of a film towards the premixing orifices is carried along by the air escaping through these orifices. It is therefore vaporized and an air/fuel mixture forms. Downstream of the plate, the mixture is carried in the direction XX where it is burnt. The diameters and flow rate are determined so that the mixture has a velocity and a local richness that prevent any ignition within the premixing orifices.

To improve the vaporizing of the fuel, flow disrupting elements may be incorporated into the walls 106' and 115B. Furthermore, the fuel performs a cooling function which is to the benefit of injector life.

As can be seen in FIG. 2, some of the air from the primary duct 101 is guided into the premixing space; the remainder escapes through the central orifice 115B1 and forms a film of anti-coking air on the external part of the plate 115B.

It can also be seen that the primary air and the secondary air may be made to rotate about the axis XX either in the same direction or in opposite directions. They may also have no tangential component.

One important advantage of this arrangement is that it makes it possible to create an idle combustion zone located towards the outside of the combustion chamber where the carburetted mixture can easily be ignited by the spark plugs located on the outer wall. When the carburetted mixture is ignited at an injector, the flame easily spreads to the other injectors because of the annular shape of the carburetted zone.

Ignition in the main circuits occurs by flame propagation also, as soon as the corresponding circuits belonging to the injectors are supplied with fuel.

Between the two circuits, operation is as follows:

At light load, only the idling circuit is ignited.

At intermediate speeds up to full throttle, both circuits are supplied with fuel, combustion extending radially throughout the chamber. The ratio of fuel deliveries of the main circuit and of the idling circuit ranges practically between 0.7 and 1.2. This staged combustion thus encourages a reduction in emissions from the idling combustion zone.

At full throttle, the ratio between the flow rates of the two circuits is between 1.8 and 2.2. This reduces the formation of smoke and polluting NOx.

Because of its compact structure, the injector can easily be incorporated into existing devices that supply combustion chambers with fuel without the need to make major modifications.

The invention claimed is:

1. A fuel injector for a gas turbine engine combustion chamber, comprising:
    a first fuel supply line for running at idle speed;
    a second fuel supply line for running at speeds up to full throttle;
    an annular distributor-forming portion with an axis XX;
    a plate provided at an end of the annular distributor-forming portion which is perpendicular to the axis XX; and
    a premixing component which is mounted on the annular distributor-forming portion, the premixing component including a sleeve portion and a screen-forming plate which is perpendicular to the axis XX,
    wherein a plurality of first injection orifices, n1, and a plurality of second injection orifices, n2, which communicate with the first and second supply lines, respectively, are disposed in a ratio n1/n2<1 in the plate provided at the end of the annular distributor-forming portion, the first and second injection orifices are arranged in a ring at a predetermined radial distance from the axis XX, the first orifices occupying one sector of said ring,
    wherein premixing orifices are disposed in the screen-forming plate of the premixing component, the premixing orifices are arranged in a first ring at a radial distance less than the predetermined radial distance from the axis XX and a second ring at a radial distance greater than the predetermined radial distance from the axis XX.

2. The injector as claimed in claim 1, wherein the ratio n1/n2 is less than or equal to ½.

3. The injector as claimed in claim 2, with wherein the ratio n1/n2 is less than or equal to ⅓.

4. The injector as claimed in claim 1, further comprising a central primary-air supply duct, the first and second injection orifices are distributed annularly about said central duct.

5. The injector as claimed in claim 1, wherein said premixing orifices are positioned in such a way as to be swept by the air of the primary flow so as to premix primary air with fuel from the first injection orifices.

6. The injector as claimed in claim 4, wherein the central duct includes a swirl inducer.

7. The injector as claimed in claim 1, further comprising an annular secondary-air supply duct coaxial with the ring formed by the injection orifices.

8. The injector as claimed in claim 7, wherein the annular duct includes a swirl inducer.

9. A gas turbine engine comprising:
    an annular combustion chamber with injectors as claimed in claim 1 distributed about the axis of the chamber,
    wherein idling fuel injection sectors are positioned radially towards the outside.

10. The injector as claimed in claim 1, wherein a diameter of the first injection orifices is between 0.5 and 0.8 mm and a diameter of the second injection orifices is between 0.8 and 1.3 mm.

* * * * *

UNITED STATES PATENT AND TRADEMARK OFFICE
CERTIFICATE OF CORRECTION

| | | |
|---|---|---|
| PATENT NO. | : 7,849,693 B2 | |
| APPLICATION NO. | : 11/868176 | |
| DATED | : December 14, 2010 | |
| INVENTOR(S) | : Francois Rene Daniel Bainville et al. | |

It is certified that error appears in the above-identified patent and that said Letters Patent is hereby corrected as shown below:

Column 2, line 32, change "$n1/n2 \leqq 1/2$" to --$n1/n2 \leq 1/2$--;

Column 2, line 33, change "$n1/n2 \leqq 1/3$" to --$n1/n2 \leq 1/3$--;

Column 6, line 22, delete "with" before "wherein".

Signed and Sealed this
Fifteenth Day of March, 2011

David J. Kappos
*Director of the United States Patent and Trademark Office*